United States Patent [19]
Jordan

[11] 3,970,850
[45] July 20, 1976

[54] POOL COOLING INFRARED TELESCOPE
[75] Inventor: William D. Jordan, Dallas, Tex.
[73] Assignee: The United States of America as represented by the Secretary of the Army, Washington, D.C.
[22] Filed: May 20, 1975
[21] Appl. No.: 579,168

[52] U.S. Cl. .............................. 250/352; 250/338; 62/467 R
[51] Int. Cl.² ...................... G01J 3/02; F17C 7/00
[58] Field of Search ........... 62/61, 74, DIG. 9, 467; 250/338, 352

[56] References Cited
UNITED STATES PATENTS

| | | | |
|---|---|---|---|
| 3,018,643 | 1/1962 | Evers | 250/352 X |
| 3,180,989 | 4/1965 | Hand, Jr. et al. | 250/352 |
| 3,836,779 | 9/1974 | Bruno et al. | 250/352 |
| 3,899,674 | 8/1975 | Decramer et al. | 250/352 |

*Primary Examiner*—Archie R. Borchelt
*Attorney, Agent, or Firm*—William G. Gapcynski; Lawrence A. Neureither; Jack W. Voigt

[57] ABSTRACT

An infrared telescope that has a detector therein that must be cooled to near 20°K in order to function properly is cooled by freezing a pool of liquid cryogen through rapid venting of a chamber containing the cryogen to a low pressure to cause the cryogen to freeze by the pressure of the liquid cryogen being dropped below the fluid triple point pressure. In this way, the frozen pool of liquid cryogen which is in contact with the detector maintains the detector in a cooled and operating range.

3 Claims, 5 Drawing Figures

3,970,850

POOL COOLING INFRARED TELESCOPE

BACKGROUND OF THE INVENTION

In the missile industry, there is a need for cooling means for a detector of an infrared telescope. This detector needs to be cooled to near 20°K and this needs to be accomplished while the telescope and missile are spinning.

Therefore, it is an object of this invention to provide a simple cooling means for a detector that includes a chamber on one side of the detector with a frozen cryogenic material on said one side to cool the detector.

Another object of this invention is to provide a cooling means in which the detector can be effectively cooled even with the detector in a spinning motion.

A further object of this invention is to provide a simple cooling system that utilizes the low pressure atmosphere that the device is launched into in order to effect cooling of the cryogenic material.

Still another object of this invention is to provide a cryogenic material such as neon that can have the pressure thereof dropped below its fluid triple point pressure in order to freeze a pool of the neon and effect appropriate cooling of the detector.

Still further objects and advantages of this invention will be obvious to those skilled in this art.

SUMMARY OF THE INVENTION

In accordance with this invention, a missile with an infrared telescope that has a detector therein is provided and the detector is cooled using a pool of cryogenic material in a chamber at one side of the detector. The cryogenic material is frozen as a pool by dropping the pressure thereon below the triple pressure point through subjecting the pool of cryogenic fluid to low pressure.

DESCRIPTION OF THE PREFERRED EMBODIMENT

Figure 1:
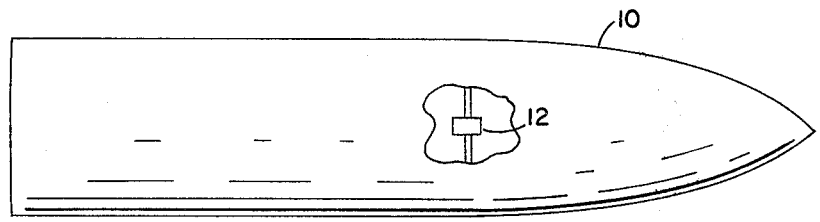
FIG. 1 is a perspective view partially cut away of a missile with the infrared detector device according to this invention.

Referring now to FIG. 1, a missile 10 is illustrated that is adapted to be launched into space and missile 10 contains an infrared detector device 12 therein.

Figure 2:
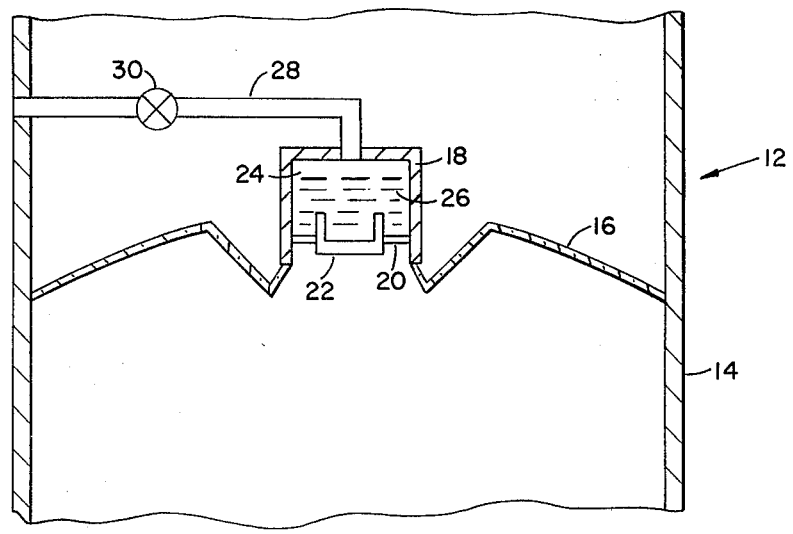
FIG. 2 is a sectional view partially cut away and illustrating a detector and the cooling thereof according to this invention.

Infrared detector device 12 as shown in FIG. 2 includes housing 14 with mirrors 16 mounted therein, housing structure 18 connected to the inner portion of mirrors 16, and insulation 20 interconnecting detector element 22 with housing 18 to form chamber 24 with a pool of liquid 26 therein. A line 28 connects chamber 24 through valve 30 and housing 14 to the atmosphere. Detector element 22 for detecting infrared radiation must be cooled and maintained at a low temperature and liquid 26 is therefore a cryogenic fluid such as neon that is frozen to maintain detector 22 at the low critical temperature for detector element 22.

Figure 3:
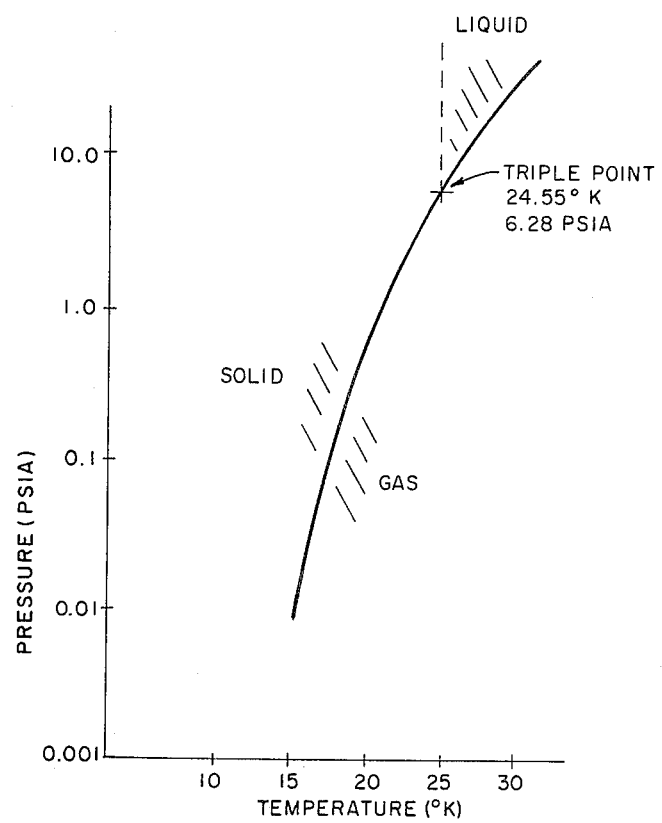
FIG. 3 shows the relationship of cryogenic neon relative to the solid, liquid and gaseous states at various temperatures and pressures.
Figure 4:
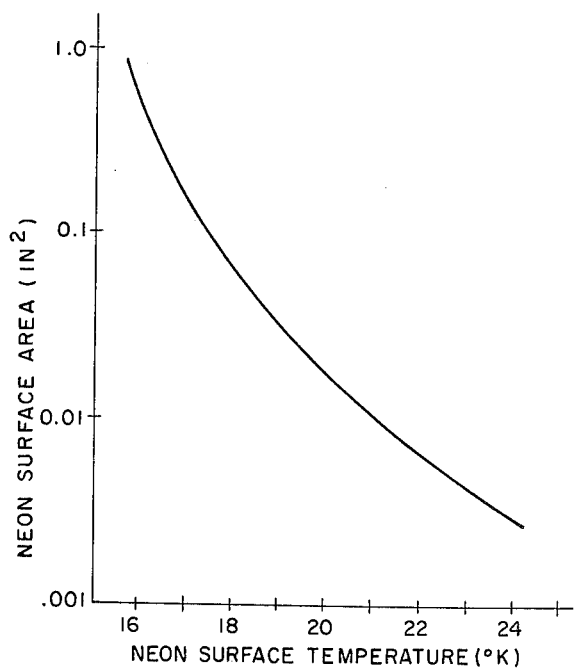
FIG. 4 shows the relationship of the cryogenic neon surface area to the surface temperature.
Figure 5:
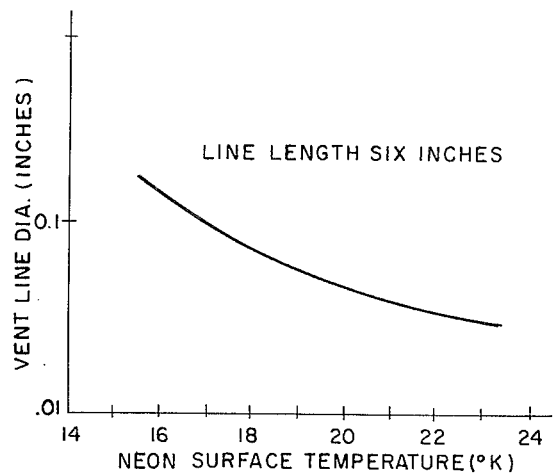
FIG. 5 shows the vent line diameter in relation to the cryogenic neon surface temperature.

In operation, detector 12 is onboard missile 10 for detecting infrared signals for a period of approximately four minutes and missile 10 is in the upper atmosphere and spinning. Therefore, the atmospheric pressure that is allowed to enter chamber 24 from the opening of valve 30 in line 28 is at a very low pressure and the system operates as follows: neon 26 in chamber 24 is initially near 26°–27°K in the subcool liquid state. At the appropriate time with missile 10 in the upper atmosphere and spinning, vent valve 30 is opened and neon 26 begins evaporating, generating gas and the energy for the evaporation process cools the remaining liquid. As the pressure over the liquid falls below the neon triple point (24.5°K and 6.3 psia), some solid particles will form as illustrated in FIG. 3 and further evaporation will freeze the entire liquid pool 26. It is indicated that about 20 percent of liquid 26 will be vaporized in the cool down and freezing process. As liquid pool 26 freezes, the solids will begin sublimation and the temperature will stabilize at some equilibrium condition determined by the triple point diagram illustrated in FIG. 3 and corresponding to the back pressure required to vent the subliming gas generated by the heat input from sensor element 22. The sublimation process, hence solid temperature, can be reduced by increasing the vent line size of tube 28 and increasing the subliming surface area for a given heat input. FIG. 4 of the drawing shows the free neon surface area required by the detector element heat input to sublime neon at a given temperature. Temperatures in the 17°–18°K range can be obtained by use of a surface area of about 0.1 square inches. This surface can be used with a center line vent tube 28 to thereby provide symmetrical evaporation to maintain center of gravity balance. FIG. 5 shows the diameter of vent pipe 28 required to vent the subliming neon gas as a function of the subliming temperature. This figure assumes a vent line length of 6 inches. From these figures, it can be seen that neon pool 26 freezes and obtains solid neon in the 17°–18°K temperature range. One factor which influences the freezing process is vehicle spin and this factor is discussed hereinbelow. Due to missile 10 being in a spinning condition, the freezing process is accelerated since the rotational forces will tend to carry solid particles into the freezing liquid. Another effect of vehicle spin is a pressure buildup in the neon due to centrifugal forces. This pressure buildup results in a temperature gradient through the solid neon. Analysis shows that the local pressure will vary from about 2 psia at the outer reservoir wall to near zero at the inner surface for a full reservoir spinning at 14 rps. The equilibrium temperature corresponding to this pressure is 22°K, and a temperature gradient that exists with the lowest temperature at the subliming surface. It is also desirable to thermally couple the subliming surface directly to the detector subassembly since it requires the lowest temperature. This is accomplished by reservoir design that considers the total heat flow patterns and then imposes gradient due to vehicle spin. This can be accomplished by using fins or foam metals in the reservoir design to enhance the heat transfer through the frozen neon to the subliming surface.

I claim:

1. A method of cooling an infrared detector element comprising spinning said detector element, subjecting one side of said detector element to a pool of cryogenic fluid that spins as said detector element spins, and subjecting said cryogenic fluid to a low pressure sufficient for dropping the pressure on said cryogenic fluid below the triple point thereof to cause said fluid to form a frozen pool of the cryogenic fluid and thereby cool the detector element, the spinning of said detector element and said pool of cryogenic fluid when subjected to said low pressure causing accelerated freezing of said cryogenic fluid by rotational forces which tend to carry solid particles into the freezing cryogenic fluid to form said frozen pool.

2. A method as set forth in claim 1, wherein said cryogenic fluid is neon, wherein said pool is subjected to said low pressure to drop the cryogenic fluid below the triple point by a vent line that has a control valve therein for venting the cryogenic fluid to a low pressure source.

3. A method as set forth in claim 2, wherein said detector element and said cryogenic fluid are in a missile that is spinning in the upper atmosphere to cause said spinning of said detector element and said pool of cryogenic fluid and said low pressure source is the atmosphere itself.

* * * * *